United States Patent [19]

Bendzsak

[11] 4,047,092

[45] Sept. 6, 1977

[54] HIGH FREQUENCY INVERTER

[75] Inventor: Gabor J. Bendzsak, Montreal, Canada

[73] Assignee: Ajax Magnethermic Corporation, Warren, Ohio

[21] Appl. No.: 708,995

[22] Filed: July 26, 1976

[51] Int. Cl.² .......................................... H02M 7/515
[52] U.S. Cl. .................................................. 363/135
[58] Field of Search ................... 321/18, 45 R, 45 C, 321/27 R, 45 ER

[56] References Cited

U.S. PATENT DOCUMENTS

| | | |
|---|---|---|
| 3,290,581 | 12/1966 | Hooper ............................. 321/45 R |
| 3,315,145 | 4/1967 | Menard ............................. 321/45 C |
| 3,399,336 | 8/1968 | Koppelmann ................. 321/45 R X |

Primary Examiner—William M. Shoop
Attorney, Agent, or Firm—T.H. Murray

[57] ABSTRACT

A static inverter is provided suitable for use as a high frequency power supply utilizing sets of switching thyristors which are switched in pairs in a predetermined sequence, with series-related capacitors, and which includes diodes connected to insure turn-off of the thyristors and to limit the maximum voltage that can occur across the sets of thyristors.

5 Claims, 7 Drawing Figures

HIGH FREQUENCY INVERTER

BACKGROUND OF THE INVENTION

The present invention relates to static inverters for providing a high frequency alternating current power supply, and more particularly to inverters for supplying loads which may have widely and rapidly varying impedance.

Static inverters use switching thyristors, which may be arranged in various configurations, and which are switched ON and OFF in a predetermined sequence to provide an alternating current output of frequency determined by the switching rate. Such inverters are used to provide a high frequency power supply from a direct current source, or through rectifiers from a conventional power line. Power supplies of this type can be used for many purposes but they are particularly useful for supplying induction heating equipment in frequency ranges of the order of 10 kilohertz, for example, because of the relative ease with which the frequency can be varied.

Induction heating coils such as are used for heat treating, melting and similar purposes are, of course, highly inductive and for this reason, it is necessary to provide a capacitor in parallel with such coils to raise the power factor to an acceptable value. A tank circuit is thus formed which is preferably operated at or near parallel resonance. In the use of such equipment, however, the magnetic characteristics of the work, or other conditions, may vary during operation so that the inductance and resistance of the induction heating coil change, sometimes quite rapidly, which has the effect of changing the impedance of the tank circuit and the resonant frequency. This, of course, changes the current and power dissipation in the coil and makes it necessary to control the power. This has often been done by varying the voltage or the frequency supplied to the tank circuit.

Static inverters are highly suitable as power supplies for induction heating equipment, because the frequency can readily be varied by controlling the firing times of the switching thyristors as required. Conventional inverters, however, involve certain problems such as that of turning OFF the thyristors at the desired times. This is usually done by means of commutating capacitors which apply a reverse voltage to turn the thyristor OFF. Thyristors require a definite minimum turn-off time, however, to fully regain their blocking characteristics, and the reverse voltage must be maintained at least for this length of time. This requirement places a definite limitation on the maximum frequency that can be obtained, and the use of commutating capacitors may also involve the possibility of undesirably high reverse voltages. Certain known types of static inverters are shown, for example, in U.S. patents to Landis U.S. Pat. No. 3,566,243, Duff et al. U.S. Pat. No. 3,621,366 and Brown U.S. Pat. No. 3,859,587.

SUMMARY OF THE INVENTION

In accordance with the present invention, a new type of inverter is provided which is particularly suitable for supplying induction heating equipment and which permits control of the load power and current either by varying the frequency or by controlling the applied voltage.

Inverters have been proposed which use thyristors arranged in sets each consisting of two pairs of thyristors with a series-related capacitor for self-commutation. The thyristors are switched in pairs in a predetermined sequence to produce the desired alternating current output, and since the pairs of each set are used alternately, adequate turn-off time can be provided and the maximum frequency limitation mentioned above is avoided.

It has not been possible heretofore, however, to use inverters of this type to supply induction heating equipment where the load is a tank circuit having inductance and resistance in parallel with capacitance. The impedance of such a load may change widely and rapidly during operation resulting in oscillatory conditions in the inverter circuit and large voltage swings as well as failure of the thyristors to turn OFF at the proper times. For this reason, inverters of the type described above have not been used for induction heating supplies. In accordance with the present invention, however, this problem has been overcome by including in the inverter circuit diode means connected so that they limit the voltage that can appear across the thyristors and also insure positive turn-off of the thyristors. This makes it possible to use inverters of the general type referred to above with loads of widely varying impedance such as induction heating loads.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
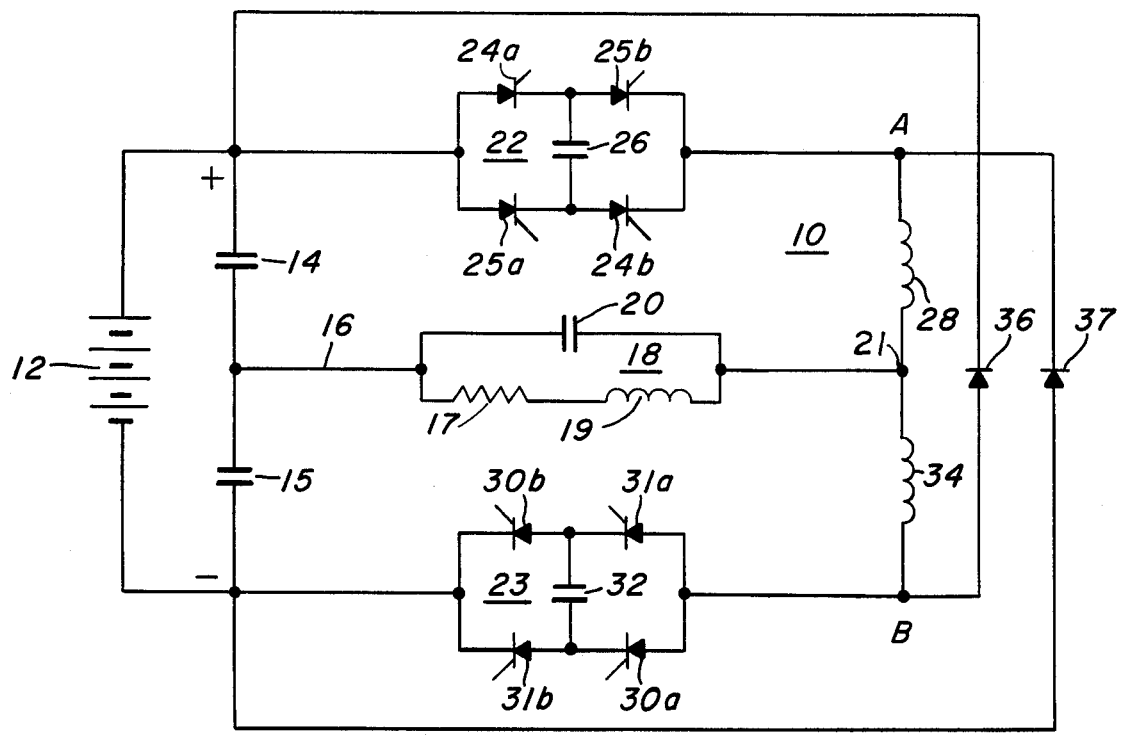
FIG. 1 is a schematic diagram of an inverter embodying the invention.

The invention is shown in FIG. 1 of the drawing embodied in an inverter 10 which is supplied with direct current from a voltage source 12 of any suitable type. In the particular embodiment shown, the voltage is supplied to the inverter through a capacitive voltage divider consisting of two identical capacitors 14 and 15 connected in series across the source 12 with a center tap connection 16 between them. It will be understood that, if desired, the voltage source 12 and voltage divider might be replaced by two equal voltage sources connected in series in place of the capacitors 14 and 15 and that any suitable type of direct current voltage source, including a rectifier output, might be used.

The inverter 10 is shown as supplying a load 18 which may consist of an induction coil for heating a workpiece and which is shown as having resistance 17 and inductance 19. A power factor correction capacitor 20 is connected in parallel with the induction coil 17–19, and the load 18 thus constitutes a tank circuit which is preferably operated at or near parallel resonance. One side of the load 18 is connected to the center tap 16 of the voltage source and the other side is connected to a terminal 21 for connection alternately to the positive and negative sides of the voltage source.

The inverter 10 includes two sets 22 and 23 of thyristors and capacitors. Each set includes two pairs of thyristors with a capacitor connected to be in series relation with both pairs of thyristors. Thus, the set 22 consists of a first pair of thyristors 24a and 24b, and a second pair of thyristors 25a and 25b. The thyristors are connected in two parallel branches, as shown, with one thyristor of each pair in each branch. A capacitor 26 is connected between the midpoints of the two branches so as to be in series relation with the two thyristors of each pair. The set 22 is connected to the positive side of the voltage source and through an inductor 28 to the load terminal 21, so that when either pair of thyristors is conductive, current can flow in one direction through the load 18.

The second set 23 is similar to the first set. That is, the set 23 consists of a pair of thyristors 30a and 30b and a second pair of thyristors 31a and 31b, connected in two parallel branches with one thyristor of each pair in each branch and with a capacitor 32 connected between the midpoints of the two branches. The set 23 is connected to the negative side of the voltage source and through an inductor 34 to the load terminal 21, so that when either pair of thyristors of the set 23 conducts, current flows in the opposite direction through the load 18.

Figure 2:
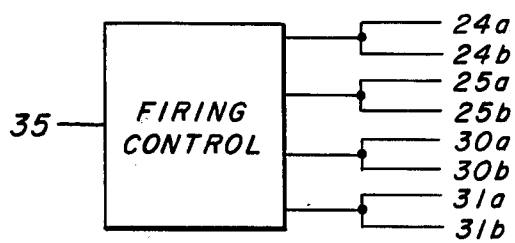
FIG. 2 is an illustrative waveform of the voltage across the load in the circuit of FIG. 1.
Figure 2:
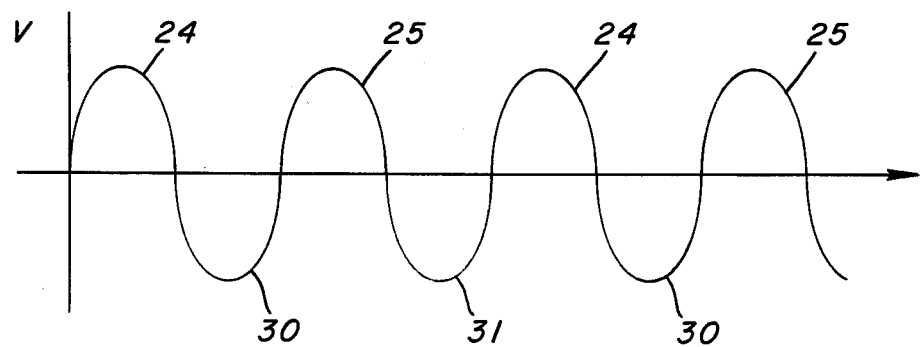

An alternating current is thus caused to flow in the load 18 by gating the different pairs of thyristors into conduction alternately in the two sets 22 and 23. This may be done by a firing control 35 of any desired type which supplies firing signals to the gate electrodes of the various thyristors in a predetermined sequence. As indicated above, the thyristors are fired in pairs, the two thyristors of each pair being designated a and b, respectively, on the drawing. In operation, the thyristors are fired in sequence, one pair being fired, or made conductive, in the set 22, for example, followed by one pair in the set 23, the second pair in set 22, and the second pair in set 23. The two sets thus conduct alternately, and the two pairs of thyristors of each set alternate. FIG. 2 illustrates a typical voltage waveform produced across the load 18 in this way, the particular pair of thyristors which is conductive in each half-cycle being indicated to show a typical firing sequence. It will be understood that any desired type of control may be utilized to fire the thyristors in pairs in the desired sequence.

In the operation of the inverter, the thyristors are fired in pairs as described above, each pair being in series relation with the corresponding capacitor. Assuming, for example, that the thyristor pair 24 is first made conductive, current flows from the positive voltage source through the thyristor 24a, the capacitor 26 and the thyristor 24b to the terminal 21 of the load. This results in charging the capacitor 26. The current is, of course, prevented from reversing by the valve characteristic of the thyristors.

At this point, the thyristors 30a and 30b can be fired, causing current to flow in the opposite direction through the load 18 to the terminal 21 and through the thyristors to the negative side of the voltage source. The capacitor 32 is thus charged, in the same manner as described above, until its current falls to zero. Durin this time, the capacitor 26 continues to maintain a reverse voltage on the thyristors 24a and 24b which are thus turned OFF. It will be noted that ample turn-off time is available. Fo the next half-cycle, the thyristors 25a and 25b are fired, permitting current to again flow from the positive side of the voltage source to the load 18. The polarity of the capacitor 26 is now reversed, with respect to its previous polarity, so that it discharges and then recharges with opposite polarity to maintain a reverse voltage on thyristors 25a and 25b at the end of the half-cycle. During this time, the capacitor 32 is maintaining reverse voltage on the thyristors 30a and 30b. The thyristors 31a and 31b are now fired and the operation continues in each half-cycle in the manner described, the two sets 22 and 23 being made conductive alternately and the pairs of thyristors in each set alternating in conduction. It will be observed that the switching rate for each individual pair of thyristors is half the frequency of the output current in the load since the thyristor pairs of each set conduct alternately. This is an advantage of this type of inverter since it permits the reverse voltage to be maintained on each thyristor for a relatively long time so as to insure turn-off. The maximum frequency obtainable can thus be relatively high.

An inverter as so far described can be successfully operated with some types of load having fixed characteristics. Induction heating loads, however, involve certain problems. Such a load comprises a tank circuit consisting of an induction heating coil having inductance and resistance, with a capacitor in parallel with the coil, and is preferably operated at or near parallel resonance. Both the resistance and reactance of such a load can vary widely during operation. Thus, the impedance of the coil depends on the magnetic characteristics of the workpiece which is inductively coupled to the coil, and the magnetic characteristics can change greatly with the temperature of the work, as when passing through the Curie point, for example. Similarly the impedance may be affected by changes in the physical relation of the workpiece to the coil or in the configuration of the workpiece as it is heated. Since both the resistance and the reactance of the load vary widely during operation, and may change very rapidly, the load impedance is subject to wide and rapid changes during operation and the parallel resonant frequency also changes. The series circuit consisting of the tank circuit 18, the inductor 28 or 34 and the capacitor 26 or 32 form an oscillatory circuit with a series resonant frequency which can be different from the inverter switching frequency and from the tank circuit resonant frequency. The wide changes in the impedance of the tank circuit during operation, and the difference that may exist between the resonant frequency of the tank circuit and the switching frequency of the inverter, can cause severe oscillatory conditions resulting in rapid voltage changes, which can cause extremely high voltages across the thyristors. Under these conditions, control of the load power and current is extremely difficult and economically impractical. The general type of inverter described above, therefore, has not been usable for induction heating loads.

In accordance with the present invention, a new inverter is provided capable of satisfactory operation with a load such as a tank circuit including an induction heating coil. The new inverter, as shown in FIG. 1, is based on the circuit previously described, but involves the inclusion of diodes 36 and 37 in the circuit. These may be single diodes, as shown for illustration, or may each include any necessary number of individual diodes connected together in series or parallel as required by the voltages and currents involved. The cathode of diode 37 is connected to the point A, which is one terminal of inductor 28 and the anode of diode 37 is connected to the negative side of the voltage source. The cathode of diode 36 is connected to the positive side of the voltage source and the anode of diode 36 is connected to the point B, which is one terminal of inductor 34. The diode 37 becomes conductive when the potential of point A becomes more negative than that of the negative side of the voltage source 12. Similarly, the diode 36 becomes conductive when the potential of point B becomes more positive than that of the positive side of the voltage source 12.

In the operation of this circuit, while a number of modes of operation are possible, in each case the diodes 36 and 37 become conductive in each half-cycle when the potential levels indicated above are reached. This has two effects. First, the respective points A and B are clamped to the supply potential, protecting the thyristors and capacitors from excessive voltages; and, second, the conductive diodes provide low resistance current paths which divert the current from the thyristors at the proper time and allow them to turn OFF. Thus, if the thyristors in set 22, for example, are ON (either thyristor pair) and current is flowing from the positive side of the voltage source to the tank circuit 18, the diode 37 becomes conductive at the previously-mentioned voltage level. This connects the point A to the negative side of the voltage source and protects the thyristors in set 22 from excessive voltages. Similarly, the diode 36 provides a low resistance current path which diverts the current from the thyristors in set 23. This automatically causes the turn-off of the thyristors of both sets at the proper times. The desired frequency of the current in the tank circuit or load 18 can be maintained even though the series circuit of the load 18, inductor 28 and capacitor 26 may be oscillating at a different frequency, and the thyristors are protected from excessive voltages. The use of the diodes 36 and 37, therefore, which conduct on alternate half-cycles, makes it possible to use this inverter circuit with a tank circuit load, the impedance of which varies widely and rapidly during operation. Furthermore, it is possible with this circuit to control the load power and current not only by varying the applied voltage of the direct current source 12, but also to control the power effectively by varying the switching frequency of the inverter.

It will be seen that a new inverter circuit is thus provided that makes it possible to obtain the advantages of the type of circuit described for induction heating and similar loads, where this type of inverter has not previously been usable. A particular simplified embodiment of the invention has been shown and described for the purpose of illustration but it will be understood that various modifications and other embodiments are possible. Thus, for example, single thyristors have been shown in FIG. 1, but each of these thyristors could be replaced by two or more thyristors connected in parallel or in series, or in any series-parallel arrangement, as required by the currents and voltages involved and as more fully described hereinafter.

Figure 3:
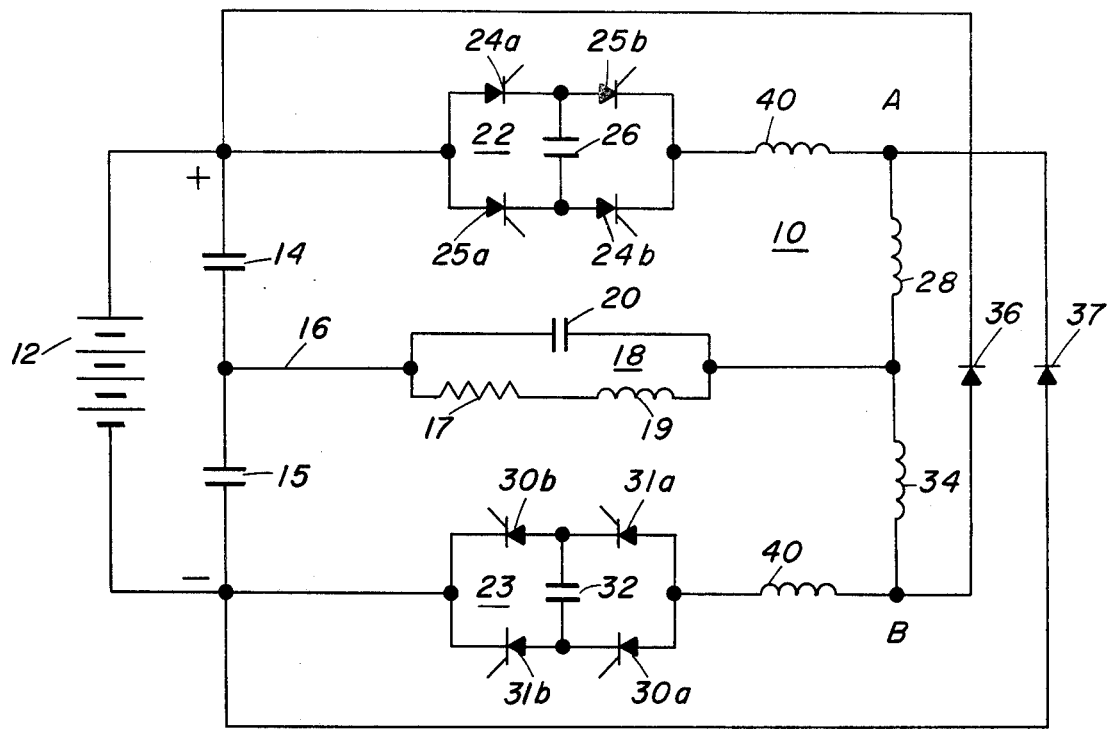
FIG. 3 is a schematic diagram similar to FIG. 1 showing a modified inverter circuit.

Another modified embodiment of the invention is shown in FIG. 3. As previously indicated, the inductors 28 and 34 are necessary elements of the series circuits which also include the sets 22 and 23 and the tank load circuit 18. Even with these inductors, however, it is possible under some conditions for the voltage across the tank circuit 18 to rise to a higher value than the center-tapped voltage of the source 12. When this occurs, both diodes 36 and 37 may conduct and could cause a high rate of rise of current in the thyristors of the corresponding set at the instant of firing. This is an undesirable effect and may be overcome, at least to a desired degree, by connecting inductors 40 between the points A and B and the corresponding sets 22 and 23. The inductors 40 limit or control the rate of rise of current to an acceptable value.

Figure 4:
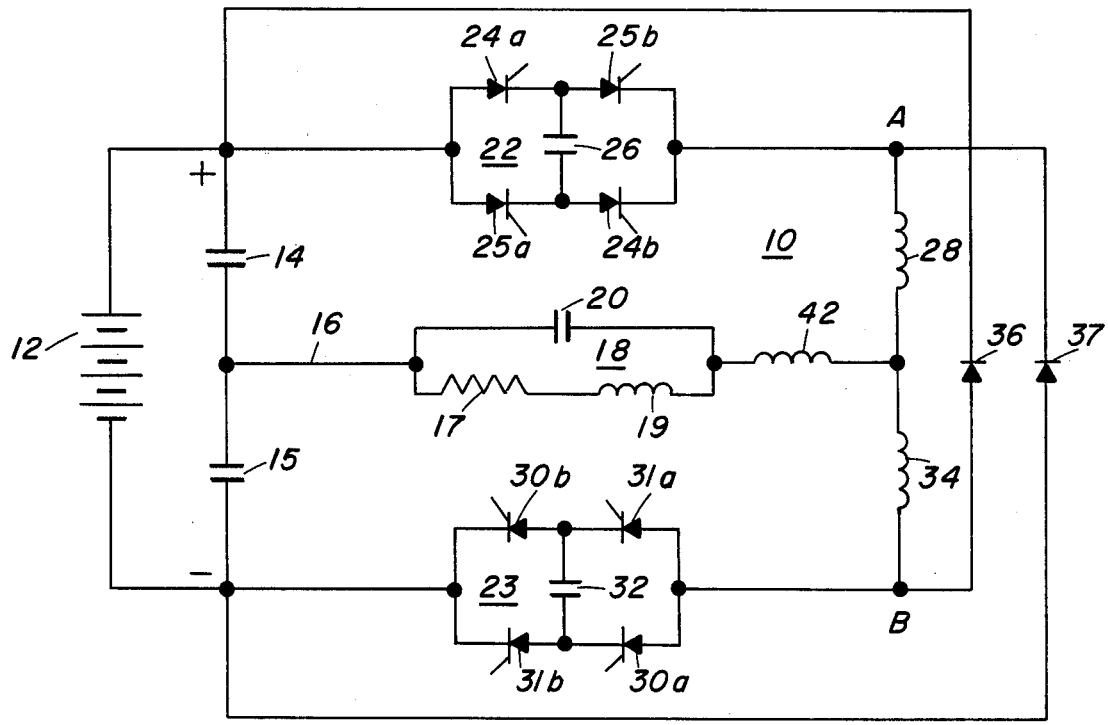
FIG. 4 is a schematic diagram showing a further modification.

It is also possible for the tank circuit 18 to have a leading power factor under some conditions of relatively high frequency. This may be avoided if desired by connecting an inductor 42 in series with the tank circuit as shown in FIG. 4. This provides a lagging component of current and thus compensates for the leading power factor of the tank circuit itself. It will be understood, of course, that the inductors 40 of FIG. 3 may also be used in the circuit of FIG. 4 if desired or necessary.

Figure 5:
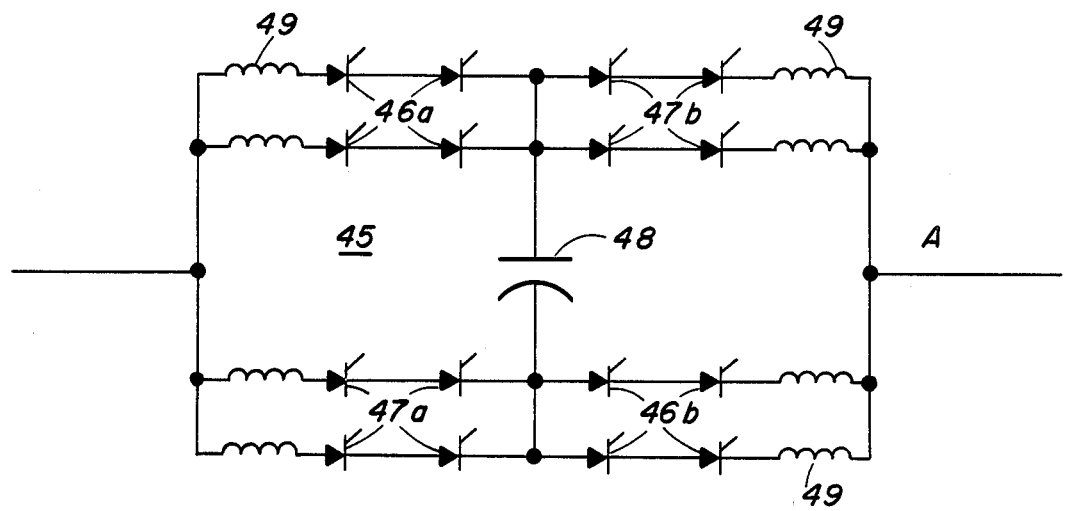
FIGS. 5, 6 and 7 are diagrams showing alternative arrangements of the sets for higher currents and voltages.

As previously mentioned, it may be necessary or desirable in many cases to utilize multiple thyristors within the set to handle the currents and voltages involved. Such multiple thyristors may be connected in any desired series or parallel arrangement as required by the conditions of a particular case. FIG. 5, for example, shows a set 45 which can be directly substituted for each of the sets 22 and 23 of FIG. 1. In the set 45, each of the pairs of thyristors consists of two assemblies, each having four series-parallel connected thyristors. Thus, the pair 46 consists of a first assembly 46a and a second assembly 46b each of which has two parallel branches with two thyristors in series in each branch. Similarly, the pair 47 consists of two assemblies 47a and 47b each having two parallel branches with two series-connected thyristors in each branch. The two pairs of assemblies 46 and 47 are connected as previously described, in two parallel branches with a capacitor 48 connected between the midpoints. Small inductors 49 may be connected in each branch of the circuit to insure equal division of the current between the parallel branches. The operation of the set 45 is the same as that previously described. That is, all thyristors of the pair 46 are fired simultaneously by the firing control 35 and all thyristors of the pair 47 are simultaneously fired on the next half-cycle of the same polarity. The operation is thus the same as described in connection with FIG. 1.

Figure 6:
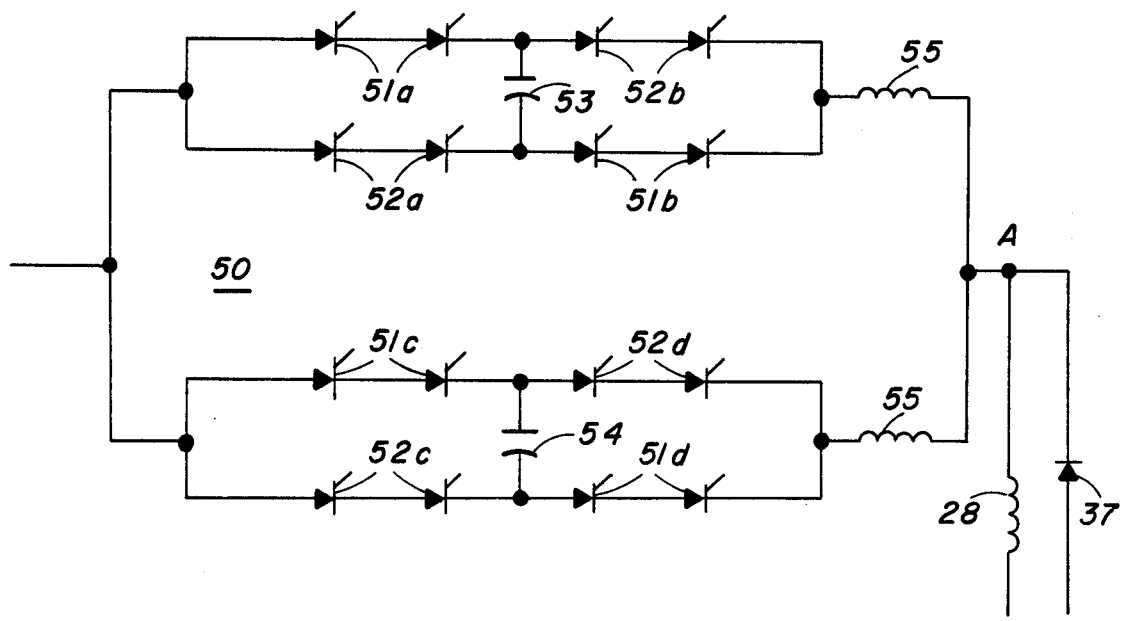

FIG. 6 shows a set 50 in which the thyristors of each pair are divided between parallel branches of the set. As before, the set has two pairs of thyristor assemblies 51 and 52. The first pair 51 consists of series-connected thyristors 51a and 51b in series relation with a first capacitor 53 in one branch of the set 50, and series-connected thyristors 51c and 51d in series relation with a second capacitor 54 in another parallel branch of the set 50. The second pair 52 similarly consists of thyristors 52a and 52b in the first branch of the set 50 and thyristors 52c and 52d in the second branch. Inductors 55 are connected in series with each branch to maintain the proper division of current and the entire set 50 may be substituted for each of the sets 22 and 23 in FIG. 1 as indicated. As before, the thyristors of each pair 51 and 52 are all fired simultaneously, the pairs alternating in successive half-cycles of the same polarity, so that the operation is the same as previously described.

Figure 7:
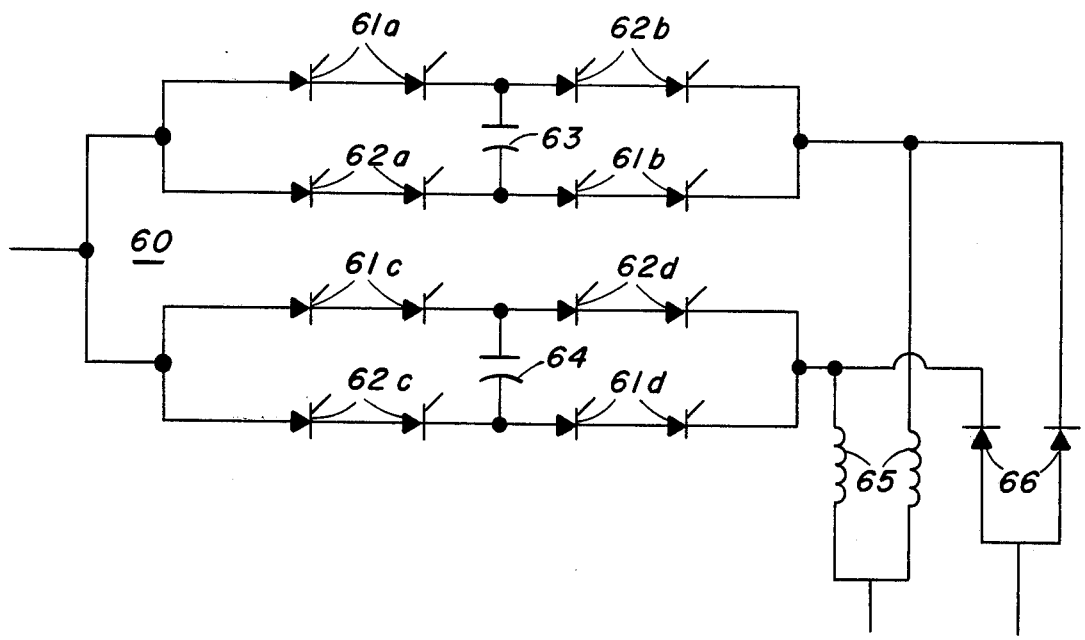

Still another arrangement for handling high currents is shown in FIG. 7. The set 60 is similar to the set 50 described above and consists of thyristor pairs 61 and 62 each consisting of series-connected thyristors disposed in two parallel branches of the set 60, in the same manner as in FIG. 6, the thyristors being similarly designated and the thyristors of each branch being in series relation with capacitors 63 and 64, respectively. In this arrangement, the series inductor in divided into two parallel inductors 65 which replace the single inductor 28 of FIG. 1, and the diodes 36 and 37 may each be replaced by two or more diodes, as indicated at 66. It will be seen that the arrangement of FIG. 7 is capable of handling very high currents as they are divided between parallel elements, and it should be noted that in both FIGS. 6 and 7 the current is also divided between the two capacitors.

It will now be apparent that a new inverter has been provided which can be used to supply loads such as induction heating coils where the impedance of the load may vary widely and rapidly during operation. Certain specific embodiments have been shown and described for the purpose of illustration but it will be understood that other modifications and embodiments are possible. Thus, for example, any desired or necessary number of thyristors may be used in series or parallel as required by the voltages and currents involved in a particular case and any suitable type of firing control may be used.

I claim as my invention:

1. An inverter for supplying high frequency alternating current to a load having resistance and inductance connected in parallel with capacitance means to form a tank circuit having an impedance which is subject to variations during operation, said inverter comprising a DC voltage source provided with a center tap, first and second sets of thyristors and capacitors, each of said sets having at least one pair of parallel branches with at least two series-connected thyristors in each branch and capacitance means connected between the midpoints of the branches of each said pair, the first said set being connected to the positive side of said voltage source, the second said set being connected to the negative side of said voltage source, one side of said load being connected to said center tap, a first inductance means connected in series between said first set and the other side of said load, a second inductance means connected in series between said second set and said other side of said load, said inductance means forming tuned circuits with said load and said capacitance means, a first diode means having its anode connected to the negative side of said voltage source and its cathode connected to the terminal of said first inductance means which is not connected to the load, a second diode means having its cathode connected to the positive side of said voltage source and its anode connected to the terminal of said second inductance means which is not connected to the load, and means for firing said thyristors in a predetermined sequence alternating between the first and second of said sets to cause an alternating current to flow in the load, the thyristors of each set being fired in pairs, each pair consisting of thyristors in different parallel branches of the set, the thyristors of each pair being in series relation with the capacitance means, and the pairs of each set being fired alternately, whereby the polarity of the voltage across the capacitance means within each said set reverses with each half-cycle of current delivered by said set.

2. An inverter as defined in claim 1 and having series inductance means in circuit with each of said sets.

3. An inverter as defined in claim 1 and including inductance means connected in series with said tank circuit.

4. An inverter as defined in claim 1 in which each of said pairs of parallel branches of each said set includes at least two parallel-connected thyristors.

5. An inverter as defined in claim 1 wherein a plurality of series combinations of first sets and first inductance means are connected in parallel between the positive side of said voltage source and said other side of said load, a plurality of series combinations of second sets and second inductance means are connected in parallel between the negative side of the voltage source and said other side of the load, and wherein diode means connect from said terminal of each said first inductance means to the negative side of said voltage source and from said terminal of each said second inductance means to the positive side of said voltage source.

* * * * *